(12) United States Patent
Vorst

(10) Patent No.: US 6,943,799 B2
(45) Date of Patent: Sep. 13, 2005

(54) GAZE DIRECTED VISUAL SYSTEM

(75) Inventor: Carl J. Vorst, St. Ann, MO (US)

(73) Assignee: The Boeing Company, Chicago, IL (US)

( * ) Notice: Subject to any disclaimer, the term of this patent is extended or adjusted under 35 U.S.C. 154(b) by 517 days.

(21) Appl. No.: 10/112,824

(22) Filed: Mar. 29, 2002

(65) Prior Publication Data

US 2003/0184561 A1 Oct. 2, 2003

(51) Int. Cl.[7] .............................................. G09G 5/399
(52) U.S. Cl. ........................... 345/539; 345/540; 345/8
(58) Field of Search ................................ 345/539, 540, 345/545, 546, 7–8

(56) References Cited

PUBLICATIONS http://www.trimension–inc.com/library/reserve.html.www.seus.com.
http://www.es.com/products/displays/vistaview/index.asp.
http://sbir.navair.navy.mil/Expo_pages/SDSIntna.htm.

*Primary Examiner*—Matthew C Bella
*Assistant Examiner*—Mackly Monestime
(74) *Attorney, Agent, or Firm*—Shimokaji & Associates, P.C.

(57) ABSTRACT

A gaze directed visual system includes a gaze tracker for determining an area of interest; an image generator for generating an area of interest image about the area of interest and generating a background image elsewhere; paired field buffers, for each field of view, for providing a composite image from the area of interest image and the background image; and a timing and control block for interleaving timing of read and write operations on each pair of field buffers whereby reading of the composite image commences upon completion of writing a first portion of the background image so that transport delay is minimized in displaying the composite image on a high resolution display device.

21 Claims, 2 Drawing Sheets

GAZE DIRECTED VISUAL SYSTEM

BACKGROUND OF THE INVENTION

The present invention generally relates to flight simulators and, more particularly, to visual systems for high performance military flight simulators.

Users of high performance military flight simulators are demanding higher resolution visual systems in order for the viewer, or pilot, to be able to distinguish air and ground targets and other features. For example, air combat applications may call for the high-resolution display of many simultaneous eye-limiting targets. Also, for example, ground attack applications may call for a large region of terrain to be displayed at a high resolution as well as one or more air targets. In general, higher resolution displays are more expensive, requiring more complicated hardware than that required to provide lower resolution displays. For example, a high-resolution image generator that puts high resolution everywhere incurs a high cost that comes from computing a high-resolution image in areas of the viewer's visual field of view where the human visual system can only see low resolution. The additional expense for the higher resolution systems required to achieve the training objectives requiring higher resolution, combined with budget limitations, may lead to fewer systems being purchased than the number required to train a sufficient number of pilots to meet the objectives.

A common strategy to address the economic problem of providing high resolution display is to provide high resolution display only in an area of interest (AOI) determined by the direction of the pilot's head position and, ideally, the direction of the eye's gaze. By providing high-resolution display over a small area and lower resolution display everywhere else, the requirement for more complicated hardware can be reduced and cost savings achieved. Implementation of this strategy, however, is not without difficulties. For example, one implementation of this strategy may use a background projector for displaying the low-resolution portion of the image and an area of interest, or AOI, projector for displaying the high-resolution portion of the image. The following disadvantages, for example, may be exhibited in such an implementation. The AOI projector and its associated background projector typically require careful dynamic intensity correction to assure that distracting color and intensity mismatches don't occur. Also, the AOI projector, being an analog device, is subject to drift between colors of the AOI and background images. Finally, the AOI projector, although requiring less complicated hardware than would be required for providing high resolution everywhere, still requires a significant amount of hardware.

One example of a prior art implementation of the AOI projector is known as the mechanically slewed AOI projector. The mechanically slewed AOI projector comprises a high-resolution inset projector and a low-resolution background projector that are optically combined through a servo driven projection head. Disadvantages include cost and reliability of the moving projection head and difficulty in matching colors and intensities between the AOI and background projectors. The mechanically slewed AOI projector is limited to use with front projection dome or mini-dome type systems, which also limits the potential for high image contrast.

Another example prior art implementation of the AOI projector is known as the electronically slewed AOI projector. The electronically slewed AOI projector system uses one or more electronically slewed AOI projectors to provide a green or a red/green inset over a low-resolution full color background image. The system may be designed for a rear projection display system made up of several smaller field of view screens abutted to form a full field of view display. A blue inset is generally not required because of the relatively small contribution of blue color required to present a high detail image. Disadvantages include the cost of additional projectors for each of the fields of view and a relatively complex alignment process for intensity and position.

Other prior art approaches include that of matrixing limited capability personal computer (PC) based image generators into one larger field of view by using a common field buffer memory or by optically combining the image generator fields of view directly on a projection screen. These approaches, like the approach of the high resolution image generator that puts high resolution everywhere, incur a cost disadvantage that comes from computing a high resolution image in areas where the human visual system can only see low resolution.

Another prior art approach includes placing high-resolution targets as an inset into background image in digital memory. For example, one implementation is a memory management device in which a set of individual high-resolution targets are written over a lower resolution background. Targets are specifically selected for high resolution, and as a result, the benefits of the approach are limited due to the inability to assure that the eye's high-resolution fovial region is always presented with a high-resolution simulated image. One implementation has a second mode in which an entire field of view, in an array of fields of view, is selected for high-resolution presentation.

As can be seen, there is a need for low cost high-resolution image generation for high performance flight simulators. There is also a need for low cost high-resolution image generation that is totally digital rather than incorporating analog or electromechanical-optical techniques. Moreover, there is a need for low cost high-resolution digital image generation, which is efficient by not generating high-resolution images in areas where the human visual system can only see low resolution.

SUMMARY OF THE INVENTION

The present invention provides low cost high-resolution image generation for high performance flight simulators. The present invention also provides low cost high-resolution image generation that is totally digital rather than incorporating analog or electromechanical-optical techniques. Moreover, the present invention efficiently provides low cost high-resolution digital image generation by avoiding the generation of high-resolution images in areas where the human visual system can only see low resolution.

In one aspect of the present invention, a gaze directed visual system includes a gaze tracker for determining an area of interest; an image generator output providing a single or multiple color high resolution area of interest image and a second image generator output providing a single or multi-color background image elsewhere; paired field buffers, for each field of view, for providing a composite image from the area of interest image and the background image; and a timing and control block for interleaving timing of read and write operations on each pair of field buffers whereby reading of the composite image commences upon completion of writing a first portion of the background image so that transport delay is minimized in displaying the composite image on a high resolution display device.

In another aspect of the present invention, a gaze directed visual system includes a gaze tracker for determining an area of interest; an image generator output providing a single or multiple color high resolution area of interest image and a second image generator output providing a single or multi-color background image elsewhere; at least one pair of field buffers for providing a composite image from the area of interest image and the background image; and a timing and control block for interleaving timing of read and write operations on the paired field buffers whereby each reading of the composite image commences upon completion of writing a first portion of the background image so that the composite image is displayed with minimized transport delay on a high resolution display device.

Each field buffer includes a display memory for storing the area of interest image and the background image, and an area of interest mask address memory for keeping track of a location of the area of interest image within the background image.

In still another aspect of the present invention, a gaze directed visual system includes a gaze tracker for determining an area of interest by tracking a viewer's direction of gaze and providing the direction as a set of angles to a host computer; an image generator output providing a single or multiple color high resolution area of interest image and a second image generator output providing a low resolution background image elsewhere. The system also includes a pair of field buffers, an odd field buffer and an even field buffer, for providing a composite image from the high-resolution area of interest image and the low-resolution background image.

Each field buffer includes a display memory for storing the high resolution area of interest image and the low resolution background image; an area of interest mask address memory for keeping track of a location of the high resolution area of interest image within the low resolution background image; and a pair of line buffers for providing synchronization between the field buffer and the high resolution display device.

The system also includes a timing and control block for interleaving timing of read and write operations on the pair of field buffers. The timing and control block interleaves, between the odd field buffer and the even field buffer, timing of the writing of the high resolution area of interest image and the low resolution background image into the odd field buffer and the writing of the high resolution area of interest image and the low resolution background image into the even field buffer. Each of the writings, into the odd field buffer and into the even field buffer, occurs within an image generator field time. The timing and control block interleaves, between the odd field buffer and the even field buffer, timing of the reading of the composite image from the odd field buffer and timing of the reading of the composite image from the even field buffer, where the reading from the odd field buffer occurs within a display field time commencing after a fixed time delay sufficient to allow time to write the area of interest image into the odd field buffer and the reading from the even field buffer occurs within a display field time commencing after a fixed time delay sufficient to allow time to write the area of interest image into the even field buffer. Reading of the composite image commences upon completion of writing a first portion of the low-resolution background image so that the composite image is displayed with minimized transport delay on a high-resolution display device.

In a further aspect of the present invention, a method for providing a composite image to a high resolution display includes steps of determining an area of interest; generating a high resolution image about the area of interest; generating a low resolution background image; combining the high resolution image and the low resolution background image into a composite image in a field buffer memory comprising an odd field buffer and an even field buffer; and reading the composite image using interleaved timing between the odd field buffer and the even field buffer so as to display the composite image on a high resolution display device.

These and other features, aspects and advantages of the present invention will become better understood with reference to the following drawings, description and claims.

DETAILED DESCRIPTION OF THE INVENTION

Figure 1:
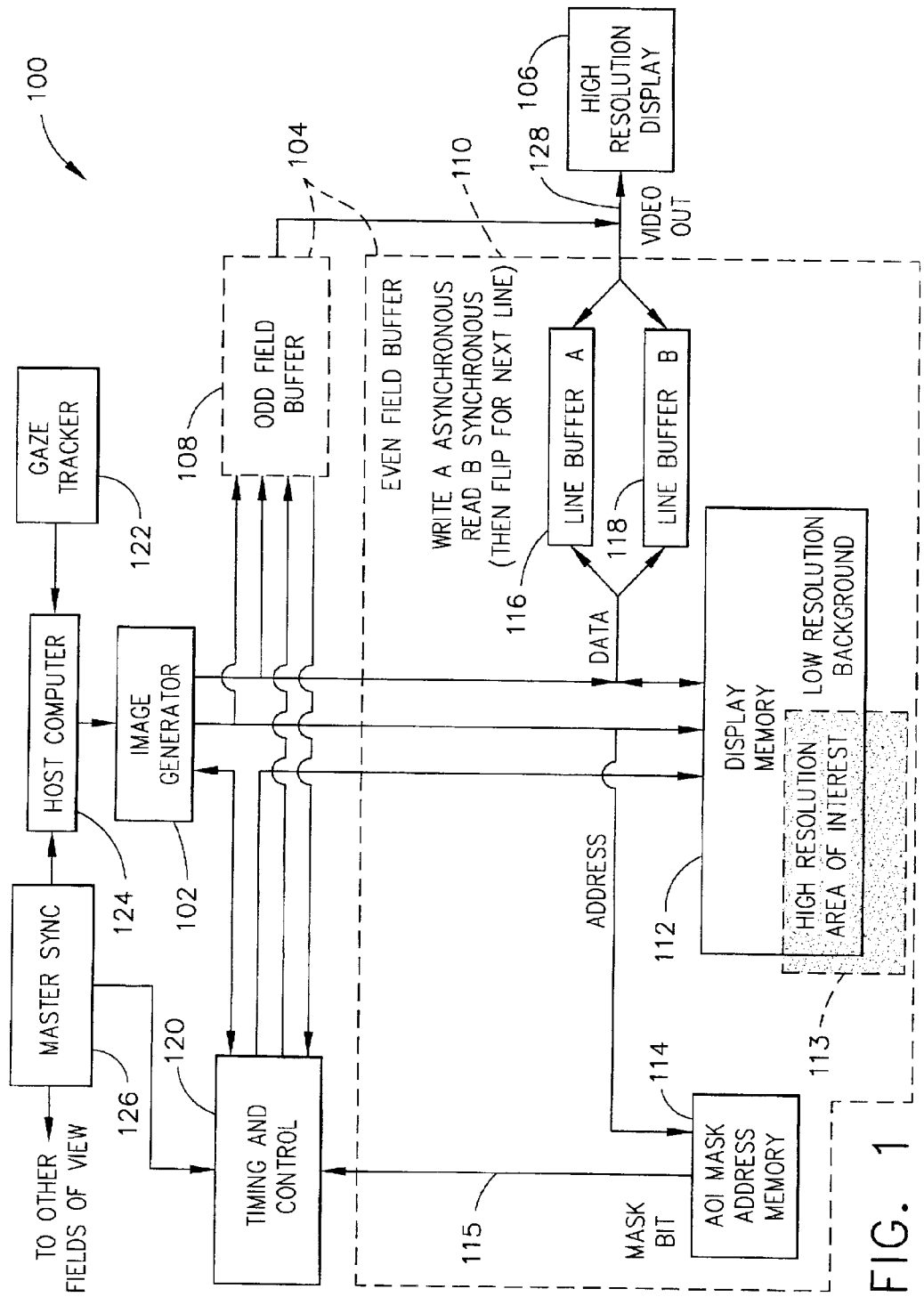
FIG. 1 is a block diagram of a gaze directed visual system, for providing high resolution visual images in an area of interest, according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides low cost high-resolution image generation for high performance flight simulators. The present invention solves the problem of increased cost associated with higher resolution visual systems by providing higher resolution only in the direction that the viewer is looking, avoiding the generation of high-resolution images in areas where the human visual system can only see low resolution. In one embodiment, the high resolution digital image generation provided by the present invention avoids problems associated with cost and reliability of the moving projection head and difficulties in matching colors and intensities between AOI projectors and background projectors that are inherent in some prior art analog or electromechanical-optical systems, such as area of interest (AOI) projection systems. Unlike these prior art electromechanical-optical projection systems, the present invention is not limited to use with front projection dome or mini-dome type systems that limit the potential for high image contrast.

In one embodiment, the present invention avoids the disadvantages of electronically slewed AOI projector systems, which include the cost of additional projectors for each of the fields of view and a relatively complex alignment process for intensity and position, by using a deterministic process to digitally combine an AOI and background image, resulting in no registration issues between the AOI and background images. In one embodiment, the present invention may use a single projector for each field of view, reducing projector costs compared to electronically slewed AOI projector systems.

In one embodiment, the present invention avoids the disadvantages of approaches that place high-resolution targets as an inset into background image in digital memory. Such approaches may be limited due to the inability to assure that the eye's high resolution fovial region is always presented with a high resolution simulated image, which arises from the approach of specifically selecting targets for high resolution and writing a set of individual high resolution targets over a lower resolution background. The gaze directed visual system of the present invention, by placing a high resolution AOI image in the direction of the viewer's gaze, can assure that the eye's high resolution fovial region is always presented with a high resolution simulated image. Even if only head position is available to direct the position of the AOI image, for example, rather than using both head and eye angles to provide a gaze directed AOI display, the present invention provides an improvement over prior art. Using only head position may result in a somewhat less efficient use of image generator resources by requiring a larger AOI display than would be required if the AOI display were gaze directed. An embodiment using only head position to direct the position of the AOI image, however, still offers an improvement in image generator efficiency over providing high resolution everywhere. Also, an embodiment using only head position still provides advantages over either mechanically or electronically slewed AOI projectors, as discussed above.

The block diagram shown in FIG. 1 conceptually illustrates gaze directed visual system 100 for providing high-resolution visual images in an area of interest, according to one embodiment. In one embodiment, gaze directed visual system 100 takes advantage of the human visual system's ability to see a high-resolution image only in a small angle surrounding the direction of the eye's gaze. Gaze directed visual system 100 does so by only generating a high resolution image, i.e., an area of interest image, about the area in which the viewer can see a high resolution image and by generating a low resolution background image elsewhere. The two images may be generated using image generator 102. The two images may be combined in field buffer memory 104 which may be provided especially for the purpose of combining the two images. After being combined, the two images are then sent to high-resolution display device 106 as a composite image. The process may be entirely digital. Special considerations may be given to system timing, as further described below in connection with FIG. 2, to reduce the delay between generation of the image and display of the image in order to accurately present the image in the correct position. This is particularly important if the viewer's position is changing rapidly with respect to the simulated image. Excessive delays result in the inability of the observer to properly control the simulator or result in a phenomenon known as simulator sickness. Simulator sickness results from a disparity between the actual visual image position verses the expected position in a dynamic situation.

Field buffer memory 104 of gaze directed visual system 100 may include a pair of field buffers, odd field buffer 108 containing the odd field image and even field buffer 110 containing the even field image. Each of odd field buffer 108 and even field buffer 110 may correspond to one field of view out of several fields of view which are being concurrently generated. Thus, field buffer memory 104 may include several pairs of odd and even field buffers even though only one pair is shown in FIG. 1 for the sake of simplicity. The high and low resolution images are combined in each of odd field buffer 108 and even field buffer 110 and the combined image is extracted, or read, from each of odd field buffer 108 and even field buffer 110 for sequential display on high resolution display device 106.

For the sake of clarity and brevity, components and features which may be common to both odd field buffer 108 and even field buffer 110 are shown in detail in FIG. 1 only in even field buffer 110. Each field buffer, i.e., each of odd field buffer 108 and even field buffer 110, may contain a display memory 112 that is the memory device for holding the image. For the purpose of conceptually illustrating the functionality of display memory 112, area of interest image 113 is shown partially overlapping display memory 112 and partially outside of display memory 112 to illustrate that, in general, the area of interest may be partially contained in several adjoining fields of view. The area of interest may also be contained entirely within a single field of view, which would be illustrated in FIG. 1, for example, by area of interest image 113 being contained entirely within display memory 112. For the sake of clarity and brevity, only one of several possible fields of view is shown in the block diagram of FIG. 1.

Each of odd field buffer 108 and even field buffer 110 may contain an area of interest mask address memory 114 for keeping track of the location of the high resolution image position within the low resolution background image stored within display memory 112. Area of interest mask address memory 114 may provide a mask bit signal 115 to timing and control block 120 to allow timing and control block 120 to control the display of high-resolution area of interest image 113 along with the low-resolution background image stored within display memory 112.

Each of odd field buffer 108 and even field buffer 110 may contain a pair of line buffers, line buffer A 116 and line buffer B 118, for providing a synchronizing function between display memory 112 and high resolution display 106. For example, one line of the image may be written asynchronously to line buffer A 116 while line buffer B 118 is being read synchronously, and then a next line of the image may be written asynchronously to line buffer B 118 while line buffer A 116 is being read synchronously. Line buffer A 116 and line buffer B 118 may each hold multiple lines of the image to facilitate synchronization.

Image generator 102 may be a conventional image generator with additions or modifications to allow timing to be synchronized with the requirements of field buffer memory 104 as determined by timing and control block 120. Image generator 102 may be constrained to be fast enough to be able to switch between the requirements to generate a high resolution area of interest image and a low resolution background image within one display field time 202, as seen in timing diagram 200 of FIG. 2.

Continuing with FIG. 1, gaze tracker 122 may comprise an eye tracker, which typically uses optical imaging to track the direction of the viewer's eyes relative to position of the viewer's head, and a conventional head tracker to determine the position of the viewer's head relative to the immediate surroundings. Alternatively, gaze tracker 122 may comprise a head tracker to be used, for example, in combination with a larger area of interest display, as described above. Typically, a head tracker may use magnetic, optical, acoustical, or inertial means, in combination with each other or separately, to determine the viewer's head pointing angle. The output from gaze tracker 122 may be a single output composed of a composite set of gaze angles, for determining an area of interest. Alternatively, the output from gaze tracker 122 may be separate sets of eye and head angles to be processed by host computer 124 to determine the direction of the viewer's eye gaze relative to the immediate surroundings, for determining an area of interest.

Host computer 124 may be conventional in architecture. The functions of host computer 124 may include, in addition to processing outputs from gaze tracker 122, accepting viewer, or pilot, inputs from switches and controls and other sources, providing outputs to indicators and instruments, and providing field of view and other state vector information to image generator 102.

Timing and control block 120 may include conventional programmable or discrete logic, or a combination of both, for generating and managing the required timing and control, for example, of image generator 102, and field buffer memory 104 including odd field buffer 108 and even field buffer 110. Master synch block 126 is the overall system timing source to which all fields of view within the total system may be synchronized.

As seen in FIG. 1, field buffer memory 104 may provide the composite image to high-resolution display block 106 in the form of video signal 128. High-resolution display block 106 may comprise a conventional high-resolution projection device, such as a cathode ray tube (CRT), digital light processing (DLP), or liquid crystal display (LCD) projector. High-resolution display block 106 may also comprise a standard high-resolution television type monitor. Video signal 128 may be provided in a format compatible with some of the emerging technologies, such as laser projectors and beam directed light valve technology.

Figure 2:
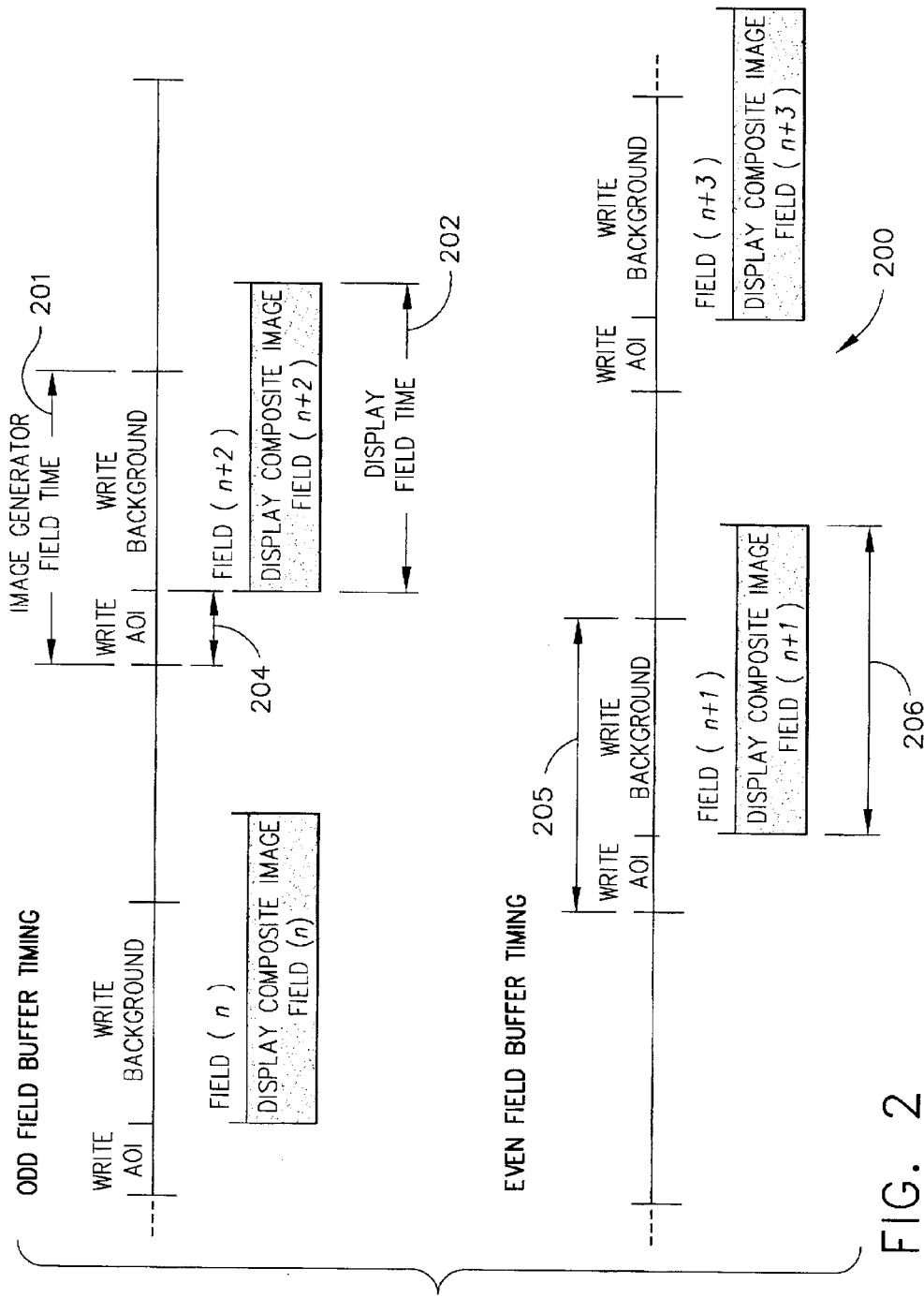
FIG. 2 is a timing diagram for a gaze directed visual system, for providing high-resolution visual images in an area of interest, according to an embodiment of the present invention.

Referring now to FIG. 2, timing diagram 200 illustrates an example of timing, according to one embodiment, for read and write operations on field buffer memory 104, including odd field buffer 108 and even field buffer 110, to generate a composite image comprising a low resolution background image and a high resolution area of interest image.

The basic system timing reference is the image generator field time, which is the time interval in which all write operations to a field buffer memory, for example, to field buffer memory 104, should occur. For example, in the case of odd field buffers, such as odd field buffer 108, at the beginning of image generator field time 201, image generator 102 writes a high resolution area of interest image, for example, area of interest 113, into odd field buffer 108 in memory locations that map to the position of the displayed image centered about the gaze angle of the viewer. After a fixed time delay 204 that is sufficient to allow time to write the area of interest 113 data into odd field buffer 108, image generator 102 switches to output, or write, the low resolution background image, which is completely written into odd field buffer 108 by the end of the odd field image generator field time 201.

Upon completion of writing the first portion of the low-resolution background image, display, i.e., reading, of the composite image may commence. The specific purpose of this sequence is to minimize transport delay of gaze directed visual system 100. Transport delay may be defined as the time for an input to a system to cause a change in the output, independent of simulation functions that may otherwise result in a computed delay. For example, by waiting to commence display of the composite image until the complete composite image is written into odd field buffer 108, a significant increase in transport delay of gaze directed visual system 100 could result.

Timing of the output data, i.e., video signal 128, may be precisely fixed for compatibility with the requirements of high-resolution display 106. For example, display field time 202, for performing a read operation from odd field buffer 108, may be synchronized with the timing of high-resolution display 106.

As seen in FIG. 2, timing of the even field is identical to timing of the odd field, except that even field timing may be delayed by one full image generator field time, i.e., the length of time represented by image generator field time 201. Odd and even image generator field times may be interleaved in time so that one begins in time after completion of the other. For example, as seen in FIG. 2, even field image generator field time 205 ends in time just as odd field image generator field time 201 begins in time. Odd and even display field times may be similarly interleaved, but with their start delayed by a fixed amount from the image generator field times. For example, as seen in FIG. 2, even field display field time 206 ends in time just as odd field display field time 202 begins in time, and the start of each of even field display field time 206 and odd field display field time 202 is delayed by an amount of time substantially equal to fixed time delay 204 from, respectively, even field image generator field time 205 and odd field image generator field time 201.

It should be understood, of course, that the foregoing relates to preferred embodiments of the invention and that modifications may be made without departing from the spirit and scope of the invention as set forth in the following claims.

What is claimed is:

1. A gaze directed visual system, comprising:
   a gaze tracker for determining an area of interest;
   an image generator for generating an area of interest image about said area of interest and generating a background image;
   a pair of field buffers, comprising an odd field buffer and an even field buffer, for providing a composite image from said area of interest image and said background image; and
   a timing and control block for interleaving timing of read and write operations on said pair of field buffers wherein reading of said composite image commences upon completion of writing a first portion of said background image, whereby said composite image is displayed with minimized transport delay on a high resolution display device;
   wherein said timing and control block interleaves, between said odd field buffer and said even field buffer, timing of reading said composite image from said odd field buffer and timing of reading said composite image from said even field buffer; and
   wherein said reading from said odd field buffer occurs within a display field time commencing after a fixed time delay sufficient to allow time to write said area of interest image into said odd field buffer and said reading from said even field buffer occurs within a display field time commencing after a fixed time delay sufficient to allow time to write said area of interest image into said even field buffer.

2. The gaze directed visual system of claim 1 wherein each field buffer of said pair of field buffers comprises:
   a display memory for storing said area of interest image and said background image; and
   an area of interest mask address memory for keeping track of a location of said area of interest image within said background image.

3. The gaze directed visual system of claim 1 wherein said timing and control block interleaves, between said odd field buffer and said even field buffer, timing of writing said area of interest image and said background image into said odd field buffer and writing said area of interest image and said background image into said even field buffer.

4. The gaze directed visual system of claim 3 wherein each of said writing into said odd field buffer and said writing into said even field buffer occurs within an image generator field time.

5. The gaze directed visual system of claim 1 wherein said gaze tracker tracks a viewer's direction of gaze and provides said direction as a set of angles to a host computer.

6. The gaze directed visual system of claim 1 wherein said pair of field buffers includes a pair of line buffers for providing synchronization between said pair of field buffers and the high resolution display device.

7. The gaze directed visual system of claim 1 wherein said area of interest image is a high-resolution image and said background image is a low-resolution image.

8. A gaze directed visual system, comprising:
    a gaze tracker for determining an area of interest;
    an image generator for generating an area of interest image about said area of interest and generating a background image;
    at least one pair of field buffers, each of said at least one pair of field buffers comprising an odd field buffer and an even field buffer, for providing a composite image from said area of interest image and said background image, wherein each said field buffer comprises:
        a display memory for storing said area of interest image and said background image; and
        an area of interest mask address memory for keeping track of a location of said area of interest image within said background image; and
    a timing and control block for interleaving timing of read and write operations on said at least one pair of field buffers wherein reading of said composite image commences upon completion of writing a first portion of said background image, whereby said composite image is displayed with minimized transport delay on a high resolution display device;
    wherein said timing and control block interleaves, between said odd field buffer and said even field buffer, timing of reading said composite image from said odd field buffer and timing of reading said composite image from said even field buffer; and
    wherein said reading from said odd field buffer occurs within a display field time commencing after a fixed time delay sufficient to allow time to write said area of interest image into said odd field buffer and said reading from said even field buffer occurs within a display field time commencing after a fixed time delay sufficient to allow time to write said area of interest image into said even field buffer.

9. The gaze directed visual system of claim 8 said timing and control block interleaves, between said odd field buffer and said even field buffer, timing of writing said area of interest image and said background image into said odd field buffer and writing said area of interest image and said background image into said even field buffer.

10. The gaze directed visual system of claim 9 wherein each of said writing into said odd field buffer and said writing into said even field buffer occurs within an image generator field time.

11. The gaze directed visual system of claim 8 wherein said gaze tracker tracks a viewers direction of gaze and provides said direction as a set of angles to a host computer.

12. The gaze directed visual system of claim 8 wherein each field buffer of said at least one pair of field buffers includes a pair of line buffers for providing synchronization between said field buffer and the high resolution display device.

13. A gaze directed visual system, comprising:
    a gaze tracker for determining an area of interest, wherein said gaze tracker tracks a viewer's direction of gaze and provides said direction as a set of angles to a host computer;
    an image generator for generating a high-resolution area of interest image about said area of interest and generating a low-resolution background image;
    a pair of field buffers, comprising an odd field buffer and an even field buffer, for providing a composite image from said high resolution area of interest image and said low resolution background image, wherein each said field buffer comprises:
        a display memory for storing said high-resolution area of interest image and said low-resolution background image;
        an area of interest mask address memory for keeping track of a location of said high resolution area of interest image within said low resolution background image; and
        a pair of line buffers for providing synchronization between said field buffer and the high resolution display device; and
    a timing and control block for interleaving timing of read and write operations on said pair of field buffers,
        wherein said timing and control block interleaves, between said odd field buffer and said even field buffer, timing of writing said high resolution area of interest image and said low resolution background image into said odd field buffer and writing said high resolution area of interest image and said low resolution background image into said even field buffer, each of said writing into said odd field buffer and said writing into said even field buffer occurring within an image generator field time,
        wherein said timing and control block interleaves, between said odd field buffer and said even field buffer, timing of reading said composite image from said odd field buffer and timing of reading said composite image from said even field buffer, wherein said reading from said odd field buffer occurs within a display field time commencing after a fixed time delay sufficient to allow time to write said area of interest image into said odd field buffer and said reading from said even field buffer occurs within a display field time commencing after a fixed time delay sufficient to allow time to write said area of interest image into said even field buffer, and
        wherein reading of said composite image commences upon completion of writing a first portion of said low resolution background image, whereby said composite image is displayed with minimized transport delay on a high resolution display device.

14. The gaze directed visual system of claim 13 further comprising an additional pair of field buffers.

15. The gaze directed visual system of claim 13 wherein said additional pair of field buffers includes an odd field buffer and an even field buffer.

16. A method for providing a composite image to a high-resolution display, comprising steps of:
    determining an area of interest;
    generating a high-resolution image about said area of interest;
    generating a low-resolution background image;
    combining said high resolution image and said low resolution background image into a composite image in a field buffer memory comprising an odd field buffer and an even field buffer; and reading said composite image using interleaved timing between said odd field buffer and said even field buffer so as to display said composite image on a high resolution display device;

wherein said reading step comprises reading said composite image from said odd field buffer within a display field time commencing after a fixed time delay sufficient to allow time to write an area of interest data into said odd field buffer; and wherein said reading step comprises reading said composite image from said even field buffer within a display field time commencing after a fixed time delay sufficient to allow time to write an area of interest data into said even field buffer.

17. The method of claim 16 wherein said determining step comprises tracking a viewer's direction of gaze using a gaze tracker and providing said direction as a set of angles to a host computer.

18. The method of claim 16 wherein said combining step comprises writing said high resolution image and said low resolution background image into a display memory using a mask address memory to keep track of a location of said high resolution image within said low resolution background image.

19. The method of claim 16 wherein said combining step comprises writing said high resolution image and said low resolution background image into said odd field buffer and said even field buffer using interleaved timing between said odd field buffer and said even field buffer.

20. The method of claim 19 wherein each said writing occurs within an image generator field time.

21. The method of claim 16 wherein said reading step comprises using a pair of line buffers for providing synchronization between said field buffer memory and the high resolution display device.

* * * * *